Nov. 6, 1956     F. J. FONTEIN     2,769,546
PROCESS AND APPARATUS FOR CAUSING A LIQUID TO FLOW ALONG
DIFFERENT CONDUITS DEPENDING ON THE VISCOSITY
OF THE LIQUID CONCERNED
Filed Oct. 13, 1952     3 Sheets-Sheet 1
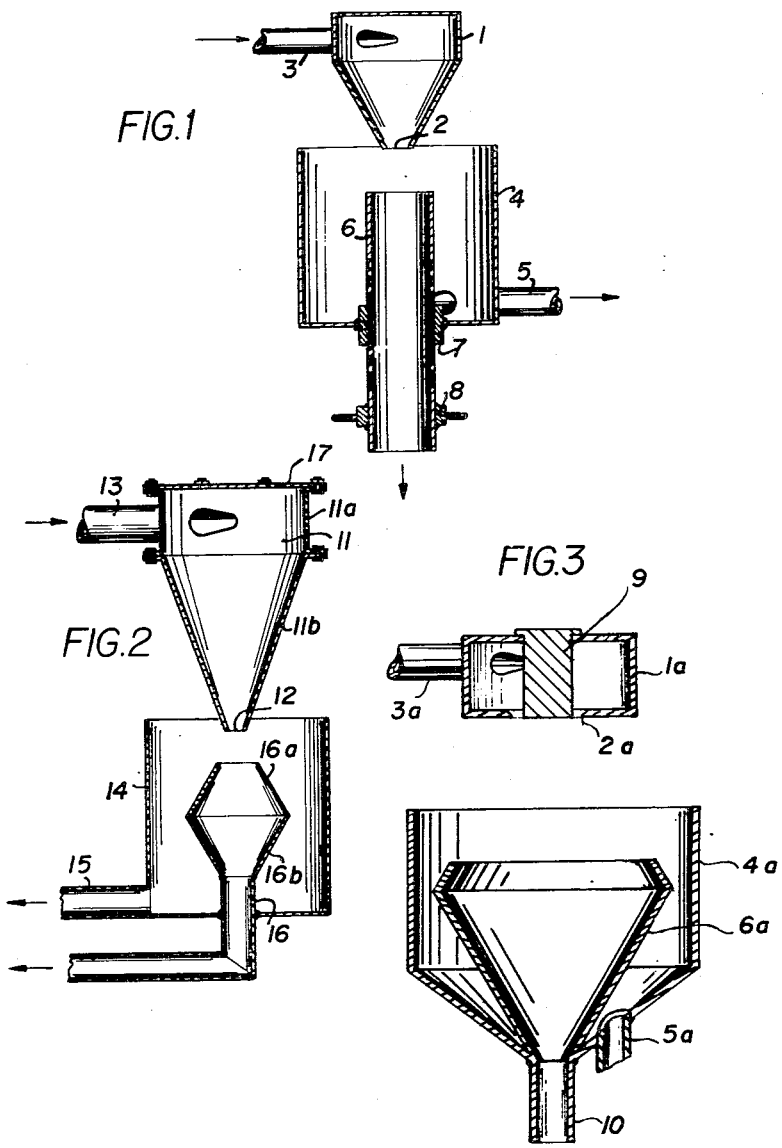

Nov. 6, 1956  F. J. FONTEIN  2,769,546
PROCESS AND APPARATUS FOR CAUSING A LIQUID TO FLOW ALONG
DIFFERENT CONDUITS DEPENDING ON THE VISCOSITY
OF THE LIQUID CONCERNED
Filed Oct. 13, 1952  3 Sheets-Sheet 3

Inventor
Freerk J. Fontein
By Cushman, Darby & Cushman
Attorneys

United States Patent Office 2,769,546
Patented Nov. 6, 1956

2,769,546

PROCESS AND APPARATUS FOR CAUSING A LIQUID TO FLOW ALONG DIFFERENT CONDUITS DEPENDING ON THE VISCOSITY OF THE LIQUID CONCERNED

Freerk J. Fontein, Heerlen, Netherlands, assignor to Stamicarbon N. V., Heerlen, Netherlands Application October 13, 1952, Serial No. 314,556

Claims priority, application Netherlands October 17, 1951

15 Claims. (Cl. 210—1)

The invention relates to a process and apparatus for causing a liquid to flow along different conduits depending on the viscosity of the liquid concerned.

The invention further relates to a process of regulating the viscosity of a liquid.

The main object of the invention is to provide a new apparatus of simple construction by which automatically a liquid is caused to flow along different conduits depending on the viscosity of said liquid.

Said liquid may be a simple liquid, a mixture of liquids or a liquid in which various substances are dissolved, dispersed and/or emulsified.

Another object of the invention is to provide a new apparatus that can be used in regulating processes depending on the viscosity of a liquid. This liquid can be one of the starting materials or the product of the process.

It is also an object of the invention to provide a new process for regulating the viscosity of a product obtained as a product of a physical or chemical process by which the viscosity of said product is affected.

Such another object is to provide a new apparatus to be used in separating two or more liquids which in a reactor or reservoir occur in several layers.

Other objects of the invention will be made clear in the following description.

The invention may be employed in many manufacturing processes, not only in those cases where an intermediate or final product of a definite minimum and/or maximum viscosity must be prepared but also in cases where it is desired to prepare a product which is to possess other fixed properties, for example a product with a minimum and/or maximum percentage of a dissolved, dispersed or emulsified substance, a minimum and/or maximum degree of polymerisation, a minimum and/or maximum temperature of a viscous substance. This can be accomplished because usually there is a simple relationship between these properties and the viscosity of the liquid.

As the apparatus according to the invention combines a very simple construction with a fully automatic operation, the viscosity can in many cases be used advantageously as the determinative factor instead of other properties, such as the composition or the specific gravity which frequently can only be determined with greater difficulty or with the aid of rather complicated or costly devices.

Determining the specific gravity of an emulsion or suspension for instance is often hampered by small gas bubbles which during the manufacture have formed in the liquid. The viscosity however is far less influenced by such bubbles.

The apparatus and process according to the invention can be particularly put to advantage in coal and ore washery practice, for example for regenerating a too strongly diluted carrier suspension or in various classifying processes where in order to ensure a constant classification, the particles to be classified should be present in a minimum and/or maximum concentration, or in other industries, such as the starch industry, where the result of purifying a suspension, for example a starch suspension, with the aid of hydrocyclones is greatly influenced by the composition of the initial suspension.

In various manufacturing processes, such as the dissolving or extracting of solid substances, which are to yield a final product of a definite optimum composition, the invention may often be applied to advantage. If the concentration of the dissolved or extracted substances in the final product is too low, as may appear from an unduly low viscosity said final product can be recycled. Other obvious applications are those processes where for example the viscosity itself of a final product is a factor of importance, as in the case in the dye, fat or glue industries.

The invention also provides a simple method by which liquids, which in a reactor or reservoir occur in several layers, can be made to run off through separate conduits provided the liquids have substantially different viscosities. If, while the material is running off, a phase boundary passes the apparatus, the liquid current can be automatically discharged through another conduit.

According to the invention use is made of the fact that if a liquid vortex is set up with the liquid by feeding the latter under sufficient pressure into a rotation chamber, the speed of rotation is, within certain limits and at a constant pressure drop over the vortex, dependent on the viscosity of said liquid.

The expression "rotation chamber" refers to a chamber peripherally bounded by a closed surface of revolution and having a centrally disposed circular discharge aperture and one or more feed passages through which liquid can be fed so as to start rotating in the chamber at a radius greater than that of the said discharge aperture.

If a liquid is supplied to a rotation chamber as above described, the liquid vortex will develop in the chamber when the feed pressure has attained a certain value. The expression "liquid vortex" denotes a body of liquid in rotational movement with a current moving spirally inwards so that the angular velocity of rotation increases from the periphery of the body towards its core. The liquid leaving through the central discharge aperture, which at a lower feed pressure issues as a more or less "twisted" jet, now starts rotating so rapidly that the jet expands into the form of a sheet or film having the shape of a hollow cone.

The angle of the discharge cone increases with increase in the feed pressure until a certain pressure is reached whereafter the angle remains substantially constant.

It is found that the pressure at which the liquid vortex develops is higher and the speed of rotation and hence, within certain limits, also the angle of the discharge cone is smaller, the higher the viscosity of the liquid.

If the feed pressure is kept constant, the magnitude of the apex angle of the discharge cone will be a measure of the viscosity on the understanding that the viscosities to be measured are lower than those at which there is just no spread and are higher than those at which the angle of the discharge cone is at its maximum.

Tests have shown that the viscosity range within which, when operating at a constant pressure and with a given rotation chamber, the angle of the discharge cone is sufficiently variable lies between the limits of a certain minimum viscosity and a viscosity which is about 2–10 times as high dependent upon the shape and dimensions of the rotation chamber on the one hand and the feed pressure on the other.

If now a discharge receiving pipe or vessel is provided for receiving the discharge from the said discharge aperture and the discharge receiving mouth of the said pipe or vessel is arranged facing the said discharge aperture with its edge disposed so with respect to the said aperture that a given discharge cone will pass either wholly within or wholly outside the said edge, the liquid will, depending on its viscosity, be delivered into or outside of the collecting pipe or vessel. The rotation chamber is preferably placed with its axis substantially vertical and with its discharge aperture directed downwards.

If one or more further discharge receiving pipes or vessels are provided, which or each of which has a discharge receiving mouth of the abovementioned character, the discharge from the rotation chamber can be received in separate fractions one or more of which has a viscosity between predetermined limits. In any case, in use, it is desirable to employ at least two discharge receiving pipes or vessels, the outermost pipe or vessel being arranged to receive all liquid discharging outside the next inner pipe or vessel. Such an outermost pipe or vessel need not have a discharge receiving mouth as herein defined. For example it may be in the form of a tank within or in other suitable relation to which the discharge chamber and its discharge receiving pipe(s) or vessel(s) with their discharge receiving mouth(s) is (are) placed so that the tank collects any liquid discharging outside of the or the outermost of the said mouths. It can also be a trough in which more than one rotation chamber discharges and by which the received product is discharged.

In one simple construction of apparatus we employ one discharge receiving cylindrical pipe which is disposed co-axial with the rotation chamber with its mouth cut off square, and a discharge receiving tank for receiving all liquid discharged outside of the said pipe. As long as the viscosity of the liquid does not fall below a given minimum value the liquid will be delivered into said co-axial pipe whereas if the viscosity does fall below such value, the liquid will be discharged into the tank.

It is not essential that the collecting vessels be located entirely inside each other or be of a rotationally symmetrical design, but the apparatus will always include one discharge receiving pipe or vessel with its mouth so disposed with respect to the discharge aperture of the rotation chamber that liquid above a certain viscosity discharges within and liquid below that viscosity discharges outside of the said pipe or vessel. In other words the edge of the said mouth will be intersected by the boundary of an imaginary straight cone co-axial with the rotation chamber and passing through the edge of the discharge aperture of such chamber.

An accurate separation can only be obtained if the distance between the discharge aperture and the edge of the discharge receiving mouth or mouths located so as to be intersected by the boundary of the discharge cone at given viscosities is not much greater than the distance at which the discharge cone falls apart into separate drops. Beyond said point the liquid discharge cone diverges considerably.

A liquid with a given minimum and/or maximum viscosity can be collected separately according to the invention, and liquids that do not come up to requirements can be returned into the system or be treated separately, as may be desired. By re-cycling liquid the process can be controlled in a simple manner in such a way that finally only a liquid of a given minimum and/or maximum viscosity will be delivered.

As stated before, the critical value of the viscosity at which the boundary of the discharge cone hits the edge of a discharge receiving mouth depends on the pressure drop over the vortex, the shape and dimensions of the rotation chamber, the dimensions of the said mouth and on the distance between the mouth and the discharge aperture. By suitable choice of these variables the apparatus can, within certain limits, be so adjusted as to yield liquid of a given minimum and/or maximum or intermediate viscosity.

If only the feed pressure is raised the value of said critical viscosity increases. If, under otherwise unaltered conditions, the distance between the mouth and the edge of the discharge aperture is diminished the value of the critical viscosity will drop. A regulation within certain limits can also be realized by making provision for varying the cross sectional area of the feed pipe to the rotation chamber or the diameter of the discharge aperture.

The shape and diameter of the rotation chamber are factors of importance. It has been found for example that if the rotation chamber is given the shape of a cylinder with an adjoining straight conical portion, much depends on the magnitude of the cone angle of such portion. The smaller the cone angle, the more difficult it is to develop the vortex and the lower is the speed of rotation at a given feed pressure. By narrowing the apex angle of such a rotation chamber the apparatus is made to respond to a lower viscosity. The same result can attained by increasing the height of the cylindrical portion of the chamber.

Further it was found that a considerable increase of the variation range of the angle of the discharge cone can be obtained by inserting into the discharge aperture of the rotation chamber a solid core with a circular cross section, this core being adjusted co-axially with the rotation chamber. This core can be fixed or revolving and can be attached inside the rotation chamber to the wall opposite the discharge aperture or outside the rotation chamber to the inner receiving vessel adjusted opposite the discharge aperture.

Of importance is that the attachment of the solid core does not interfere with the liquid current inside the rotation chamber or the discharge cone outside said chamber if liquid is pressed through the apparatus.

The diameter of the solid core in the discharge aperture is so chosen as to have filled the remaining ring-like aperture with liquid if a liquid is pressed through the apparatus in order to cause a flow along different conduits depending on the viscosity.

In summarizing it can be said that the abovementioned objects and still other objects can be obtained according to the invention by my new process and apparatus for causing a liquid to flow along different conduits according to its viscosity which process or apparatus is characterized by the use or the presence of a rotation chamber as herein referred to constructed so that by feeding a liquid under sufficient pressure into said chamber a liquid vortex is set up in the chamber from which discharge takes place in the form of a hollow cone, and by the use or presence of at least one discharge receiving pipe or vessel with a mouth facing the discharge aperture and located so that its edge is intersected by the boundary of an imaginary straight cone passing through the edge of the discharge aperture and co-axial therewith so that discharge through or outside the said mouth depends upon the viscosity of the discharging liquid.

The apparatus further includes an outermost discharge receiving pipe or vessel with a mouth of sufficient size for receiving all liquid discharging outside the next inner mouth and the mouth of this outermost pipe or vessel need not necessarily be a mouth as herein defined. The mouth or each mouth as the case may be may be adjustable axially to vary the angle of said imaginary cone.

The invention further consists in a process of regulating the viscosity of a liquid according to which use is made of the above apparatus, the liquid which does not meet the requirements being recycled.

Without limiting my invention to this I will now explain the invention with the aid of a number of embodiments thereof illustrated in the accompanying drawings, in which:

Figs. 1, 2 and 3 schematically show vertical sections of two simple constructional forms of apparatus according to this invention.

Figure 4:
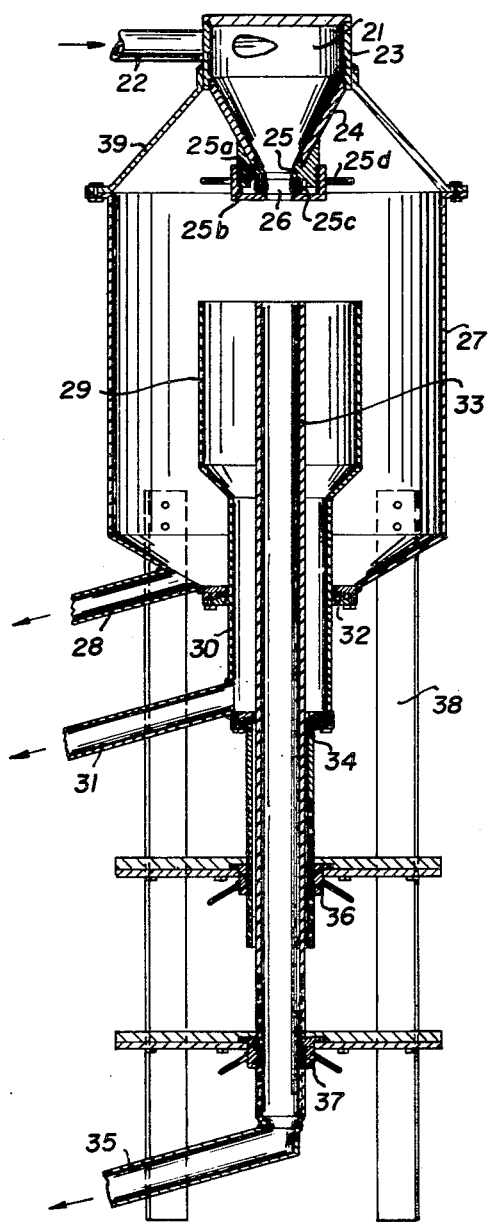
Fig. 4 is a similar view of a form of apparatus capable of yielding a liquid product whose viscosity is intermediate between two values.

The simple apparatus of Fig. 1 consists of a rotation chamber 1 as herein defined, provided with a discharge aperture 2, and a feed pipe 3 in tangential relation thereto. Under the discharge aperture there is a vessel 4, which is provided with a discharge pipe 5 in this case disposed tangentially thereto in order to effect rapid removal of the liquid. A circular section pipe 6 is arranged in vessel 4 so as to be co-axial with the rotation chamber, said pipe being screwed into a ring 7 secured in the bottom of the vessel. With the aid of the handwheel 8, the tube 6 can be screwed up or down for adjusting its height and hence the viscosity of the liquid corresponding to a discharge jet having the shape of a hollow cone which is caught in the mouth of the central pipe. The rotation chamber 1 and the vessel 4 are so connected (not shown) as to prevent them from moving with respect to each other. The edge of the mouth of the pipe is intersected by the boundary surface of an imaginary cone which passes through the edge of the discharge aperture.

Fig. 2 shows another construction which is suited for delivering a suspension e. g., a loess suspension of a given minimum specific gravity. The rotation chamber 11 of this apparatus consists of a cylindrical portion 11a which by means of a flange is connected to a conical portion 11b and is closed by the cover plate 17.

The tangentially directed feed pipe 13 opens into the cylindrical portion 11a. The suspension obtained from a thickener is pumped through the rotation chamber at a given pressure. If the solid matter content and hence the viscosity of the suspension are sufficiently high the suspension can be caught in the pipe 16 the mouth of which is provided with a conical part 16a adjoining an inverted conical part 16b. A drop in the concentration and hence also in the viscosity will result in an enlargement of the angle of the discharge cone so that the liquid is directed outside the edge and caught in the collecting vessel 14 whence it can be carried off through the pipe 15. This liquid which has too low a concentration of solid matter may then be returned to the reservoir of the feed pump (not shown) of the aforementioned thickener as a result of which a recirculation is effected. This brings about a rise in the concentration of the infed suspension and consequently also in that the thickened suspension leaving through the discharge aperture 12. This goes on until the concentration and hence also the viscosity have reached again such a value that the suspension can be collected in the pipe 16 and carried off thereby. For finely adjusting the minimum viscosity of the thickened suspension which is to be carried off, the rotation chamber and the collecting assembly must be so positioned that the one can be shifted axially in relation to the other.

The following experiment may serve to illustrate the operation of the apparatus. At a pressure of 0.5 atm. gauge pressure a loess-sand suspension, having a specific gravity varying from 1.694 to 1.829, was supplied to a rotation chamber of the following dimensions:

Diameter cylindrical portion_____ 350 mm.
Height cylindrical portion_____ 100 mm.
Half apex angle_____ 10°.
Diameter feed aperture_____ 30 mm.
Diameter—discharge aperture_____ 30 mm.

The angle of the spray cone was found to vary between 99° and 63°. A collecting assembly according to the figure and measuring 300 mm. in diameter at the upper edge of the mouth 16a was placed below the discharge aperture, the distance between the plane of said upper edge and the plane of the edge of the discharge aperture 12 being adjusted to 210 mm. The minimum specific gravity of the suspension carried off through the pipe 16 was then 1.795. The specific gravity of the suspension carried off through the pipe 15 was lower. This suspension was supplied to the reservoir of the feed pump so that the only product obtained was a suspension having a specific gravity greater than 1.795 independently of the concentration of solid matter in the feed.

Fig. 3 is a cross-sectional view of another apparatus according to the invention. A cylindrical rotation chamber 1a with a feed pipe 3a opening tangentially into the chamber is provided with a solid core 9 by which the discharge aperture 2a is altered into a ringlike aperture. Receiving vessels 6a with a discharge pipe 10 and 4a provided with a discharge pipe 5a are of the same general form as shown in Fig. 2.

It was found that with this construction of the rotation chamber the variability of the angle of the discharge cone with the viscosity was increased. E. g. with a rotation chamber as shown in Fig. 3, but without the solid core 9, having an inner diameter of 60 mm., a height of 30 mm., a feed pipe with an inner diameter of 12 mm. and a discharge aperture with a diameter of 10.5 mm., a variation range of the angle of the discharge cone of 9° was found if a liquid with a viscosity varying between 5 and 10 cp. was fed to the chamber with a feed pressure of 0.5 atm. gauge pressure.

After inserting a solid core 9 with a diameter of 8.2 mm. with the same liquid conditions, a variation range of 23° was found.

Fig. 4 is a cross-sectional view of an apparatus which is capable of yielding a liquid whose viscosity is intermediate between two values. The apparatus comprises a cyclone sprayer 21 which is composed of a cylindrical portion 23 covered by a plate and a conical portion 24. A tangentially directed feed pipe 22 opens into the cylindrical portion. The discharge aperture 26 is constituted by the nozzle 25. Said nozzle consists of two annular parts 25a and 25b which can be screwed together and between which a rubber ring 25c can be compressed more or less by turning the projections 25c on the lower ring 25b. In this manner the diameter of the discharge aperture 26 can be varied.

With the help of a few supporting members 39, the cyclone sprayer is mounted on a reservoir 27 which is mounted on the frame 38 and is provided with an outlet 28. In the bottom of said reservoir 27 there is an aperture admitting a cylindrical collecting vessel 30 rising into a widened part 29 and connected at the bottom to a delivery pipe 31. Mounted inside said collecting vessel 30 is a central pipe 33 which at its lower end connects with a discharge pipe 35. The bottom ends of the collecting vessels 30 and 33 are connected to screw adjustments 36 and 37. The nuts of said screw adjustments are so mounted in the frame 38 as to enable them to be rotated therein. Thus it is possible to raise or lower the collecting vessels 29 and 33 in the vessel 27 and the pipe 30 respectively through the guides 32 and 34 respectively.

If at a constant pressure a liquid is forced through the rotation chamber 21 via the tangential feed pipe 22, the liquid will be discharged from the aperture 26 in the form of a straight jet or in the form of a sheet or film in the shape of a hollow cone diverging more or less depending on its viscosity. A liquid with a high viscosity will be collected in the pipe 33 and be carried off through the pipe 35, whereas a liquid having a low viscosity will be directed across the edge of the collecting vessel 29 and be collected in the vessel 27 and carried away through the pipe 28. If the range of viscosity of the liquid is intermediate between the two aforesaid high and low limits which correspond with cone angles which are respectively within and without the edges of the collecting vessels 33 and 29 respectively the liquid will be caught in vessel 29 and be carried off through the pipe 31. By raising the collecting vessels 29 and 33 respectively with the aid of the adjusting screws 36 and 37 respectively the lower and the higher limit respectively of the viscosity of the liquid discharged through the pipe 31 can be lowered. These viscosity limits can be raised by lowering said vessels. Said limits can be influenced further by varying the diameter of the discharge aperture 26 with the aid of the ring 25b.

Depending on the purpose for which the separation according to viscosity is made, the resulting liquids may be treated in various ways. If it is desired to deliver a liquid having a viscosity which is intermediate between two given ranges of values, the dimensions selected and the adjustment of the apparatus must be such that this liquid is delivered through the pipe 31. The liquid flowing out of the pipe 28 or 35 may then be returned into the process or be used for other purposes. In a process which is to yield a liquid of a given minimum viscosity, the liquid desired may be carried off through the pipe 35 provided the proper dimensions have been selected and the apparatus has been adequately adjusted. In that case the pipes 31 and 28 will yield a liquid of too low a viscosity. These liquids may then advantageously be resupplied to the process at various stages thereof, e. g., the liquid from pipe 31 somewhere in the middle, and the liquid from pipe 28 somewhere in the initial stage of the process.

Figure 5:
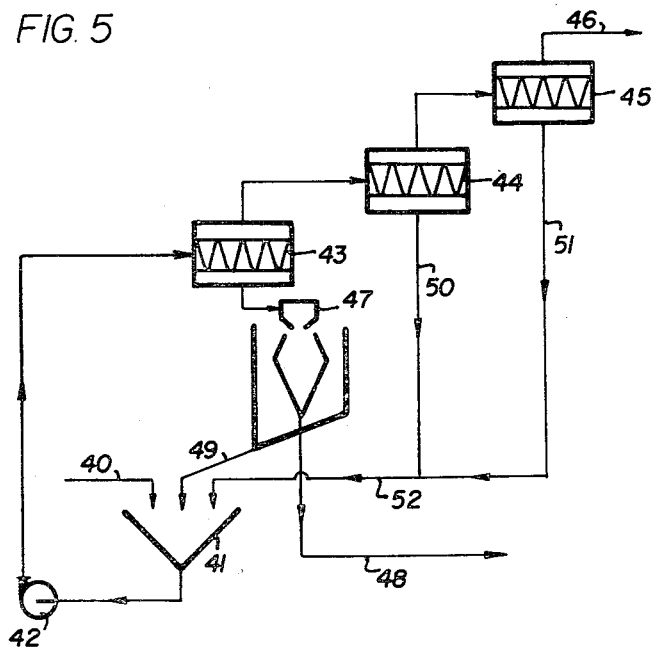
Fig. 5 is a diagram of a thickening plant incorporating apparatus for carrying out the present invention.

Fig. 5 is a diagram of a thickening plant for dilute suspension, e. g., a starch suspension, in which use is made of apparatus according to the invention. The suspension to be thickened is supplied through the pipe 40 and after passing through the pump reservoir 41 and pump 42 is forced through three multihydrocyclones 43, 44 and 45 which are arranged in series. The liquid freed from suspended matter is carrier off through the overflow 46 of the last multihydrocyclone. A suitable form of multihydrocyclone is by way of example one such as is described and claimed in the specification of application No. 168,132 filed June 14, 1950, now Patent No. 2,671,560, issued March 9, 1954.

The bulk of the suspended material is caught in the first multihydrocyclone whence it is supplied to the rotation chamber 47 in the form of a concentrated suspension. If the concentration and hence the viscosity are high enough said suspension is carried off through the pipe 48. If the concentration is too low, the liquid is returned into the pump reservoir through the pipe 49. Discharges from the following multihydrocyclones which are of too low a concentration, are returned to the pump reservoir 41 along the pipes 50 and 51 respectively and the collecting pipe 52.

In this manner a simple regulation is obtained by application of apparatus according to the invention.

Figure 6:
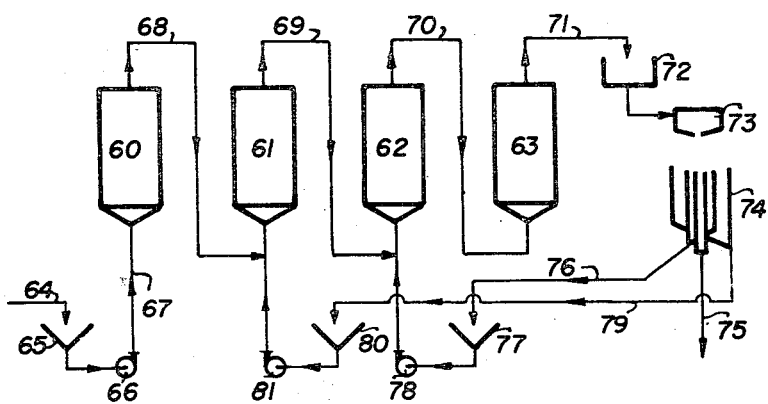
Fig. 6 is a diagram of an extraction plant likewise incorporating apparatus for carrying out the present invention.

The diagram of Fig. 6 represents an apparatus for extracting substances from a solid material by a semi continuous process in which use is made of an apparatus according to the invention. The extraction process to be carried out herewith is suited for extracting substances which according as their concentration in the solvent increases raise the viscosity thereof. In this apparatus the extracting liquid usually passes successively through a number of extraction vessels or extraction columns filled with the substance to be extracted. The vessels and columns are so interconnected by tubes, cocks and possibly also by pumps that the vessel, which is the foremost when viewing the assembly in direction of flow of the liquid, can always be disconnected and be coupled to the end of the system after the extracted substance has been replaced by a fresh charge.

One of the arrangements is shown in the figure. The vessels 60, 61, 62 and 63 connected by the pipes 68, 69 and 70 are successively traversed by the extraction liquid which is supplied along pipe 64, pump reservoir 65, pump 66 and pipe 67. If desired, the pipes 68, 69 and 70 may comprise another pump reservoir, serving as a buffer tank, and a pump. The liquid issuing from the last vessel 63 is passed to a buffer tank 72 along the pipe 71. From said tank the liquid flows, if desired, via a pump, at a constant pressure into the apparatus according to the invention, said apparatus comprising a rotation chamber 73 and a collecting assembly 74 comprising 3 compartments. If the concentration of the substances extracted is high enough, i. e., when the viscosity is higher than a given minimum value, the liquid is carried off through the pipe 75. If the viscosity, and hence also the concentration of the dissolved substances is low, the liquid is returned to a pump reservoir 80 along the pipe 79, whereafter the pump 81 returns it into the circuit along the feed pipe of vessel 61. If the viscosity is lower than the minimum viscosity desired but higher than another limit value, which will be the case when the amount of substance dissolved, though not large enough, is yet rather high already, it is advisable to supply the liquid to a more advanced stage of the extraction process. For this reason the liquid collected in the intermediate collecting vessel of the assembly 74 is supplied to the feed pipe of the vessel 62 along the pipe 76, the pump reservoir 77 and the pump 78. In this manner the concentration of the dissolved substances in the final product of the extraction can be controlled in a simple manner with the aid of the viscosity without the thoroughness of the extraction being noticeably affected.

When operating on another principle an apparatus according to the invention can be inserted between the last two vessels, which makes it possible to pass the liquid through the last vessel only if said liquid has not yet been saturated. Other combinations can be applied.

From the foregoing detailed description of the apparatus and processes embodying the invention it may be noted that many variations can be made without falling outside the scope of this invention. It should be understood, therefore, the details of the various embodiments are not intended to be limitative of the invention except in so far as set forth in the accompanying claims.

I claim:

1. Apparatus for causing a liquid to flow along different conduits according to the viscosity of said liquid comprising a closed radially symmetrical chamber, a circular axial discharge aperture in said chamber, a feed passage discharging into said chamber on a radius exceeding that of said discharge aperture, whereby said chamber is adapted to form a liquid vortex therein discharging through said discharge aperture in the form of a hollow diverging cone, a discharge receiving device positioned opposite said discharge aperture, said device including an annular discharge intercepting edge of greater diameter than said discharge aperture, axially spaced from and axially aligned with said discharge aperture, and means for separately receiving liquid passing outside and inside said discharge intercepting edge.

2. Apparatus according to claim 1, wherein the means for receiving liquid passing outside said discharge intercepting edge includes a relatively large vessel substantially enclosing the discharge aperture of said chamber.

3. Apparatus according to claim 1, including means for adjusting the axial spacing between said discharge intercepting edge and said chamber discharge aperture.

4. Apparatus for causing a liquid to flow along different conduits according to the viscosity of said liquid comprising a closed radially symmetrical chamber, a circular axial discharge aperture in said chamber, a feed passage discharging into said chamber on a radius exceeding that of said discharge aperture, whereby said chamber is adapted to form a liquid vortex therein discharging through said discharge aperture in the form of a hollow diverging cone, a discharge receiving device positioned opposite said discharge aperture, said device including two annular discharge intercepting edges of different but greater diameter than said discharge aperture, axially spaced from and axially aligned with said discharge aperture, and means for separately receiving liquid passing outside the discharge intercepting edge of greater diameter, inside the discharge intercepting edge of lesser diameter, and between said discharge intercepting edges.

5. Apparatus according to claim 4, including means for adjusting the axial spacing between one of said discharge intercepting edges and said chamber discharge aperture.

6. Apparatus according to claim 4, including means for individually adjusting the axial spacing between each of said discharge intercepting edges and said chamber discharge aperture.

7. Apparatus according to claim 1, including a cylindrical core member of smaller diameter than said discharge aperture disposed coaxially within said discharge aperture.

8. Apparatus according to claim 1, including a cylindrical core member of smaller diameter than said discharge aperture mounted in said chamber and disposed coaxially within said discharge aperture.

9. Apparatus according to claim 4, including a cylindrical core member of smaller diameter than said discharge aperture disposed coaxially within said discharge aperture.

10. Process for causing a liquid to flow along different conduits according to the viscosity of said liquid comprising the steps of feeding said liquid under pressure into a radially symmetrical space to form a liquid vortex in said space, discharging said liquid axially from said space in the form of a hollow diverging cone, and separately receiving discharged liquid passing outside and inside an annular discharge intercepting edge of greater diameter than said discharge aperture, axially spaced from and axially aligned with said discharge aperture.

11. Process according to claim 10, including the step of varying the viscosity of separation by axially adjusting said discharge intercepting edge with respect to the discharge from said space.

12. Process for causing a liquid to flow along different conduits according to the viscosity of said liquid comprising the steps of feeding said liquid under pressure into a radially symmetrical space to form a liquid vortex in said space, discharging said liquid axially from said space in the form of a hollow cone, and separately receiving liquid discharged from said space in the form of a hollow cone of apex angle exceeding a predetermined limit and liquid discharged from said space in the form of a hollow cone of apex angle less than said predetermined limit.

13. Process for causing a liquid to flow along different conduits according to the viscosity of said liquid comprising the steps of feeding said liquid under pressure into a radially symmetrical space to form a liquid vortex in said space, discharging said liquid axially from said space in the form of a hollow diverging cone, and separately receiving liquid discharged from said space in the form of a hollow cone of apex angle exceeding a first predetermined limit, liquid discharged from said space in the form of a hollow cone of apex angle less than a second predetermined limit, and liquid discharged from said space in the form of a hollow cone of apex angle between said first and second predetermined limits.

14. In a process yielding a liquid product of varying viscosity, the method of controlling the viscosity of said liquid product which comprises the steps of feeding said liquid product under pressure into a radially symmetrical space to form a liquid vortex in said space, discharging said liquid product axially from said space in the form of a hollow diverging cone, and separately receiving liquid product discharged in the form of a hollow cone of apex angle exceeding a predetermined limit and liquid product discharged in the form of a hollow cone of apex angle less than said predetermined limit.

15. In a process yielding a liquid product of varying viscosity, the method of controlling the viscosity of said liquid product which comprises the steps of feeding said liquid product under pressure into a radially symmetrical space to form a liquid vortex in said space, discharging said liquid product axially from said space in the form of a hollow diverging cone, and separately receiving liquid product discharged from said space in the form of a hollow cone of apex angle exceeding a first predetermined limit, liquid product discharged from said space in the form of a hollow cone of apex angle less than a second predetermined limit, and liquid product discharged from said space in the form of a hollow cone of apex angle between said first and second predetermined limits.

References Cited in the file of this patent

UNITED STATES PATENTS

| Number | Name | Date |
|---|---|---|
| 819,171 | Robinson | May 1, 1906 |
| 1,733,324 | Wetherbee | Oct. 29, 1929 |
| 1,825,157 | Pardee | Sept. 29, 1931 |
| 1,845,566 | Stebbens | Feb. 16, 1932 |
| 1,908,691 | Coe | May 16, 1933 |
| 1,973,607 | Bunn | Sept. 11, 1934 |
| 2,179,919 | Carr et al. | Nov. 14, 1939 |
| 2,346,005 | Bryson | Apr. 4, 1944 |
| 2,538,870 | Hunter | Jan. 23, 1951 |
| 2,631,728 | Poff | Mar. 17, 1953 |
| 2,665,809 | Chisholm | Jan. 12, 1954 |

FOREIGN PATENTS

| Number | Country | Date |
|---|---|---|
| 5,648 | Great Britain | 1912 |
| 102,429 | Sweden | Aug. 26, 1941 |
| 306,954 | Germany | July 26, 1918 |
| 315,173 | Italy | Feb. 17, 1934 |